United States Patent [19]
Dahlberg

[11] 3,862,817
[45] Jan. 28, 1975

[54] MOLD FOR LATCH OPENING

[75] Inventor: Kurt Gunnar Dahlberg, Pittsford, N.Y.

[73] Assignee: Thermo Trim, Inc., East Rochester, N.Y.

[22] Filed: Apr. 12, 1974

[21] Appl. No.: 460,294

Related U.S. Application Data
[62] Division of Ser. No. 291,914, Sept. 25, 1972.

[52] U.S. Cl.............. 425/292, 83/582, 83/694, 264/163, 425/302, 425/310
[51] Int. Cl............................................. B29c 17/14
[58] Field of Search ............. 83/694, 582; 264/163; 425/289, 310, 292, 302

[56] References Cited
UNITED STATES PATENTS
| | | | |
|---|---|---|---|
| 3,173,174 | 3/1965 | Edwards | 425/292 |
| 3,290,418 | 12/1966 | Best | 425/292 X |
| 3,341,893 | 9/1967 | Edwards | 425/310 |
| 3,342,915 | 9/1967 | Wanderer | 425/310 X |
| 3,414,941 | 12/1968 | Ignell | 425/310 |
| 3,418,690 | 12/1968 | Edwards | 425/289 |
| 3,755,522 | 8/1973 | Jope et al. | 425/292 X |

*Primary Examiner*—Robert L. Spicer, Jr.
*Attorney, Agent, or Firm*—Cumpston, Shaw & Stephens

[57] ABSTRACT

A latch opening in a plastic container is formed during the molding of the container. As mold parts close, a softened sheet of plastic is stretched over a die surface on one of the mold parts, and a former carried by the other mold part is pressed into contact with the die surface to cut through the plastic along one edge of the latch opening. As the mold parts close further, the former scrapes along the die surface and pushes the plastic across a scraped region away from the cut to form a compressed wall of plastic spaced from the cut to form the latch opening.

13 Claims, 17 Drawing Figures

PATENTED JAN 28 1975 3,862,817

MOLD FOR LATCH OPENING

This is a division, of application Ser. No. 291,914, filed Sept. 25, 1972.

BACKGROUND OF THE INVENTION

Molded plastic containers for eggs presently have a cover that latches down over a base portion of the container, and similar latching containers are useful for packaging other fragile items such as lightbulbs. The presently preferred latching arrangement for such containers requires a latch opening formed in the container cover, and since these containers have been formed by the millions in recent years, the art of forming the containers and the latch openings is well developed and settled. It includes heating a wide, continuous sheet of plastic material to soften it for molding, advancing the softened sheet repeatedly in between the parts of a multi-cavity mold, pressing the mold parts together to form the cartons while the mold parts are cooled to fix the plastic in its molded shape, separating the mold parts and repeating the process indefinitely. The mold parts are large, complex and water-cooled so there is no available space or opportunity for punching out holes in the cartons during the molding operation. Hence, a subsequent punching step is required for forming the latch opening.

The molded cartons are fed from the molding station to a punching station where the cartons are registered with punching equipment that includes male and femal dies actuated to punch out the latch openings at the desired location in each carton. The slugs of punched-out material are vacuumed away, and then the cartons are fed to a cutting and trimming station that cuts them out of the large sheets and separates them for stacking.

The hole punching equipment presently adds about $10,000 to the cost of the basic machine and also increases the size and weight of the machine considerably. Fairly precise equipment is required for registering the cartons accurately with the hole-punching equipment so that the latch openings are properly spaced, and the punching dies must be accurately made and kept sharp to form clean cut openings. The hole punching equipment causes many problems, and a significant percentage of cartons must be scrapped because of various malfunctions of this accessory.

THE INVENTIVE IMPROVEMENT

The invention involves a realization of the many disadvantages of present hole-punching equipment to form latch openings in molded containers and includes recognition of a way of forming the desired latch opening during the molding process itself with a relatively simple and workable variation in the mold to eliminate the entire hole-punching accessory and the problems it causes. The aims of the invention are generally economy, efficiency, accuracy and reliability in forming latch openings in molded containers, and it happens that the inventive molding operation forms a latch opening with a stronger latching ledge and an improved shape that is attractive in appearance, somewhat more convenient to operate, and more reliable as a latch.

SUMMARY OF THE INVENTION

The inventive molding operation improves on the art of molding plastic containers from a softened sheet of plastic formed between a pair of mold parts. The improvement includes stretching the plastic over a die surface on one of the mold parts in the region of the latch opening, and pressing a former through the stretched plastic and into contact with the die surface to cut through the plastic along one edge of the latch opening as the mold parts close. Then the former is scraped along the die away from the cut while the mold parts close further, and the plastic is pushed across the scraped region away from the cut and into a compressed wall of plastic having an edge spaced from the cut to form the opening.

DRAWINGS

Figure 1:
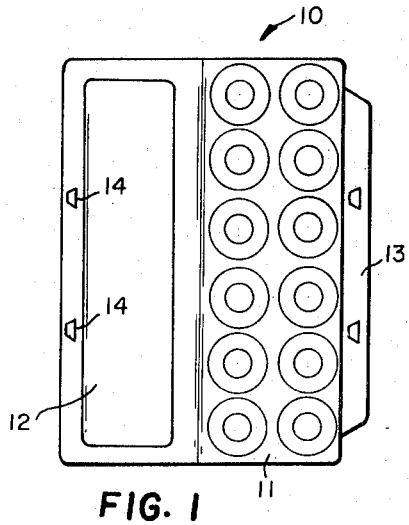
FIG. 1 is a plan view of an egg carton having a latch to be formed according to the invention.
Figure 2:
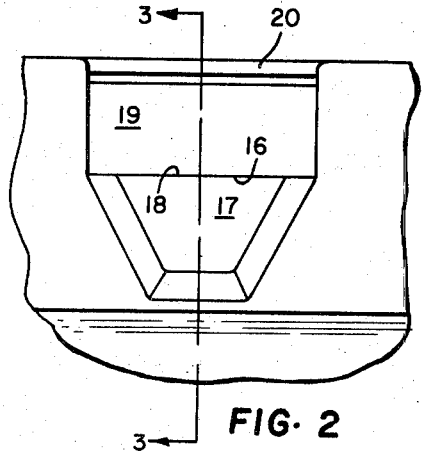
FIG. 2 is a fragmentary elevational view of the egg carton of FIG. 1 in closed and latched condition.
Figure 3:
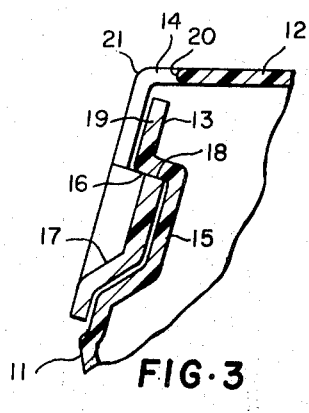
FIG. 3 is a fragmentary cross-sectional view of the carton of FIG. 2 taken along the line 3 — 3 thereof.
Figure 4:
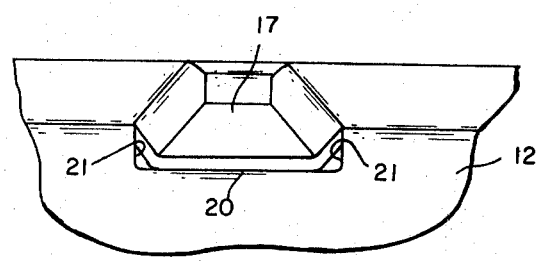
FIG. 4 is a fragmentary plan view of the latch of FIG. 2.

DETAILED DESCRIPTION:

Carton 10 of FIG. 1 is designed to hold a dozen eggs in base 11 with cover 12 closable over base 11 for latching down over the eggs. The invention is not limited to an egg carton, however, and container 10 can hold other items. The closing edge of base 11 has the latch flap 13, and cover 12 has latch openings 14 that interlock with latch flap 13 to latch cover 12 closed. The invention involves an improved way of forming latch openings in cover 12 during the process of molding container 10, but before this process is explained, the latch itself will be described with reference to FIGS. 2 - 4.

Latch flap 13 has recesses or indentations 15 formed to provide a latching ledge 16. Cover 12 has a registering recess 17 fitting into recess 15 in latch flap 13, and a latch opening 14 is formed through cover 12 above recess 17. The upper or latching edge 18 of recess 17 lies at the bottom of latch opening 14 and is shaped to slide under latching edge 16 of latch flap 13 to latch cover 12 down over base 11. A latch bar 19 above latch ledge 17 then fits into latch opening 14, and finger pressure through opening 14 against bar 19 can be used to release the latching engagement between ledge 16 and edge 18. The upper edge 20 of latch opening 14 is cut into the top of cover 12, and the sides 21 of opening 14 extend over the corner of cover 12 and down to the level of latching edge 18.

The basic latch as described above is generally known in the art. The invention involves a way of forming latch opening 14 in cover 12 during the molding operation to eliminate the separate step presently required for punching out opening 14. The inventive molding operation is best shown in FIGS. 5 – 14.

Mold part 22 for forming the interior of cover 12 carries a die 23 inlaid into the portion of mold part 22 that forms the upper corner of cover 12. Die 23 is held in place by screws 24 at the desired region for forming latch openings. A chamfered edge 25 along the top of die 23 outlines the upper boundary of the desired latch opening, and projections 26 extend downward along the sides of the desired opening. A surface 27 leads downward from chamfer 25 and is oblique or inclined relative to the closing direction of mold part 22. A recess surface 28 below surface 27 forms the interior of recess 17 in cover 12.

Figure 7:
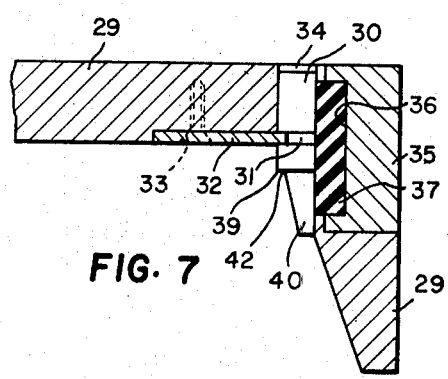
FIG. 7 is a fragmentary cross-sectional view of a former cooperating with the die of FIGS. 5 and 6.
Figure 8:
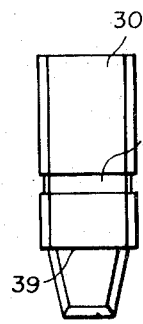
FIGS. 8 and 9 are elevational views of the former of FIG. 7.
Figure 9:
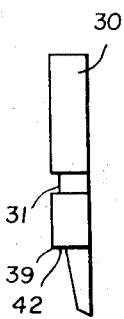

Mold part 29 of FIG. 7 mates with mold part 22 to form the outside of cover 12 and carries a former 30 for forming the latch opening. Former 30 has a slot 31 engaged by a retainer plate 32 recessed into mold part 29 and held in place by screws 33. Retainer plate 32 holds former 30 against motion vertically in the direction of mold closure, but allows limited transverse motion in opening 34 formed in mold part 29. A mounting plate 35 screwed to mold part 29 has a recess 36 facing former 30. An elastomeric block 37 formed of a material such as rubber is secured in recess 36 in any suitable way such as by adhesive, and block 37 preferably has holes 38 allowing it to be compressed in recess 36. Block 37 engages and biases former 30 against retainer plate 32 to extend fully into the cavity portion of mold part 29, but former 30 can move transversely to the closing direction of mold part 29 to compress block 37.

Former 30 has a cutting edge 39 that registers with chamfer 25, and below cutting edge 39, former 30 has a tapered projection 40 that shapes the outside of recess 17 in cover 12. The operation of former 30 relative to die 25 to form the desired latch opening in container 10 is shown schematically in FIGS. 11 – 14.

Figure 12:
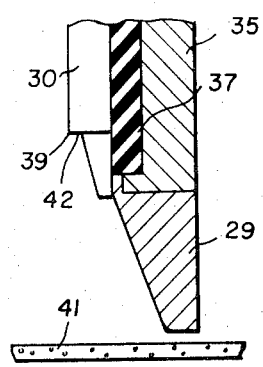
FIGS. 11 - 14 are fragmentary, cross-sectional view of the operational events forming a latch opening according to the invention.
Figure 12:
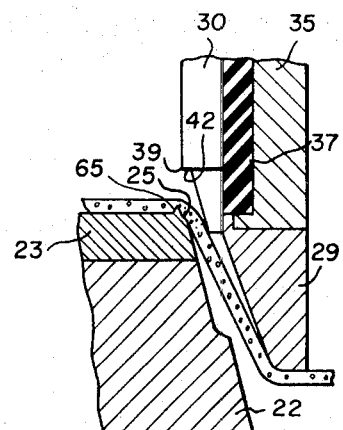
Figure 13:
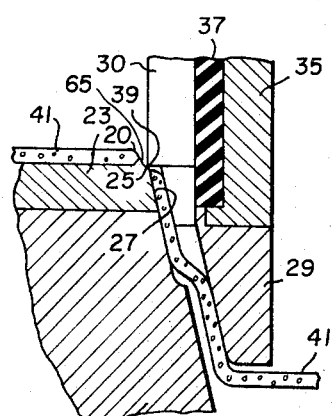
Figure 11:
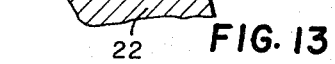

A sheet of plastic material 41 is heated and softened and fed between mold parts 22 and 29 for forming container 10. The open condition of mold parts 22 and 29 is shown in FIG. 11. As the mold parts close, plastic sheet 41 is stretched over die 25 as best shown in FIG. 12, as former 30 approaches die 25. Before mold parts 22 and 29 are fully closed, cutting edge 39 of former 30 presses through plastic sheet 41 and into engagement with chamfer 25 to cut through plastic 41 and form upper edge 20 of opening 14 as shown in FIG. 13. Resilient mounting block 37 supporting former 30 allow limited movement of former 30 relative to mold part 29 so that cutting edge 39 moves into precise registry with chamfer 25 for a clean cut around the upper edge of the desired latch opening.

Figure 14:
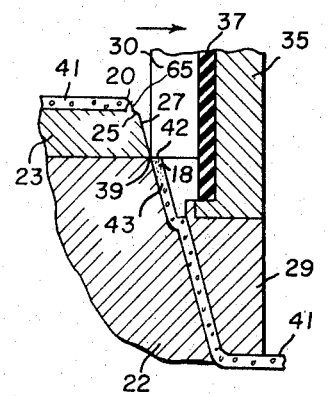

As mold parts 22 and 29 move to the fully closed position shown in FIG. 14, cutting edge 39 of former 30 scrapes over chamfer 25 and moves down inclined or oblique surface 27 to near the lower edge of die 23. This causes cutting edge 39 and the adjacent ledge 42 of former 30 to scrape along surface 27 and remove plastic 41. The scraped plastic 41 is pushed downward into a compressed wall of material 43 the upper edge of which forms latching edge 18. The scraping action of former 30 along oblique surface 29 moves former 30 transversely of the mold closing direction in the direction of the arrow of FIG. 14 to compress resilient support block 37. When mold parts 22 and 29 reopen, support block 37 pushes former 30 back to its normal position fully extended into the cavity of mold part 29.

Figure 5:
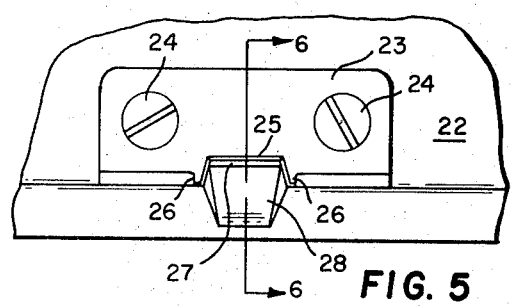
FIG. 5 is a fragmentary plan view of a die used in the practice of the invention.
Figure 6:
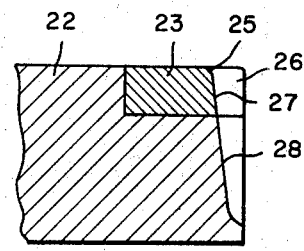
FIG. 6 is a fragmentary cross-sectional view of the die of FIG. 5 taken along the line 6 — 6 thereof.
Figure 10:
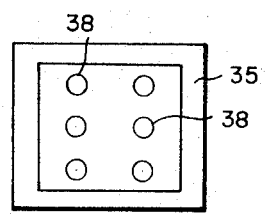
FIG. 10 is an elevational view of a mounting support for the former of FIG. 7.

Projections 26 as shown in FIGS. 5 and 6 straddle former 30 to support plastic material 41 along the side edges of the scrapedout latch opening. Plastic 41 is stretched thin over projections 26 to form tear-lines along the side edges of the latch opening, and former 30 tears plastic 41 along projections 26 and scrapes along the side surfaces of projections 26 to tear and clear away the plastic along the side edges of latch opening 14.

The relatively soft plastic material 41 is easily cut and scraped by former 30 to form a clean-cut latch opening 14, and cutting and scraping in the molding operation assures accurate positioning of latch opening 14. The compression of plastic material 41 in wall 43 forms a much stronger and tougher edge 18 for more secure latching of the carton. Die 23 and former 30 are preferably formed of hardened steel material that wears well and are made relatively simply for economical construction. Former 30 is self-aligning with die 23 for high accuracy with tolerable limits.

There are many other ways that a suitable former and die can be mounted in mold parts for forming a latch opening according to the invention. Also, dies and formers can have many different shapes that accommodate the preferred cutting and scraping motion to form a molded latch opening. One preference in this is that the die have an oblique surface scraped by the former, and relative motion between the die and former transverse to the mold closing direction is necessary to accommodate scraping motion along an oblique surface. The relatively movable part can be arranged in either half of the die, however, and former 30 need not be resiliently movable as shown in FIG. 7.

Figure 15:
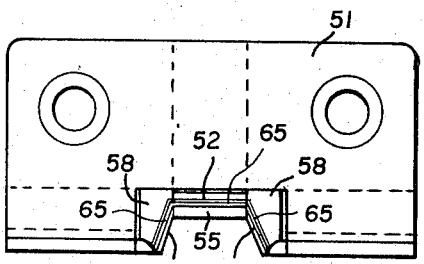
FIG. 15 is a plan view of an alternative preferred die for practicing the invention.
Figure 16:
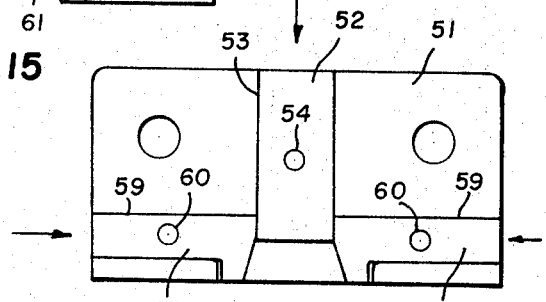
FIG. 16 is a bottom view of the die of FIG. 15.
Figure 17:
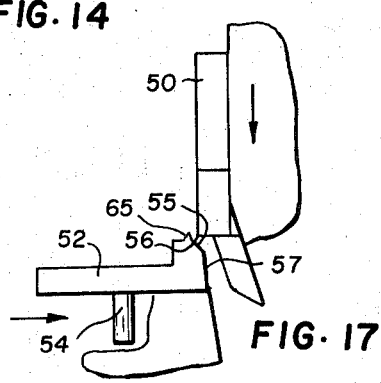
FIG. 17 is an elevational view of a former shown in cooperation with a portion of the die of FIG. 15.

For example, the preferred embodiment of FIGS. 15 – 17 uses a relatively fixed former 50 shaped similarly to former 30 and relatively movable parts in die insert 51. Die insert 51 is inlaid in the male portion of the mold at the latch opening region, but its working edges are movable and resiliently biased.

Die part 52 is movable in a slot 53 transversely to the mold closing direction to move toward and away from former 50. A spring or other resilient means engages a pin 54 on die part 52 to bias die part 52 resiliently toward former 50. Die part 52 has a chamfered upper edge 55 that engages cutting edge 56 of former 50 for cutting the upper edge of the latch opening as previously described, and as cutting edge 56 of former 50 moves downward during further mold closure, edge 56 scrapes along inclined or oblique surface 57 of die part 52 to scrape plastic away from the central latch opening region. Die part 52 moves transversely a small amount to allow downward motion of cutting edge 56, and upstanding ridge 65 along the upper edge of die part 52 thins the plastic for a better cut.

A pair of side projections 58 are movable in transverse slots 59 and are biaed inward toward each other by springs or other resilient means engaging pins 60. The inward facing surfaces 61 of projections 58 are downwardly convergent by a slight angle so that the sides of former 50 fit snugly between projections 58 and spread projections 58 slightly as former 50 drives down between surfaces 61. This provides a clean scraping along the side edges of the latch opening, and projections 58 stretch the plastic out in a thin tear-line along the side edges of the opening so that accurate tearing accompanies the scraping. Also, ridges 65 on top of projections 58 thin the plastic for a cleaner edge cut.

There are many other ways that die inserts and formers can be fitted into mold parts for scraping away plastic material to form a latch opening according to the invention, and those skilled in the art will appreciate many different mountings, spring and other resilient biases, and different preferred shapes for cutting edges, forming tear-lines, and scraping away plastic as mold parts close. Any suitable arrangement is highly valued for eliminating the hole-punching accessory with its alignment, burr, and other problems. Latch-hole molding according to the invention, also forms a compressed and stronger latching edge, perfect registration of the latch opening with the latch ledge, and a smaller and more attractive latch opening rather than a larger, punched-out opening that is oversized to accommodate misalignment problems.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the shapes, configurations, constructions, mounts and bias means suitable for forming latch openings according to the invention.

I claim:

1. A mold for forming a latch opening in a container molded from a softened sheet of plastic, said mold comprising:
  a. a former arranged on one part of said mold;
  b. a die surface arranged on the other part of said mold;
  c. said die surface having a surface oblique to said closure motion of said mold;
  d. said former being normally registered with said die surface to contact said die surface during closure of said mold to cut said plastic along one edge of said latch opening; and
  e. resilient support means providing relative motion between said die surface and said former transverse to the closure motion of said mold to allow said former to scrape along said oblique surface during further closure of said mold to scrape said plastic away from said cut and into a compressed wall of said plastic having an edge spaced from said cut to form said opening.

2. The mold of claim 1 wherein said die includes projections extending outward from the sides of said oblique surface to form the side edges for said opening.

3. The mold of claim 2 wherein said projections are shaped to stretch said plastic to form tear-lines and to cooperate with said former for tearing said plastic along said tear-lines and clearing said side edges of said opening.

4. The mold of claim 2 including means for allowing said projections to move apart, and resilient means for biasing said projections toward a minimum separation.

5. The mold of claim 4 wherein said projections have converging oblique surfaces that are scraped clear of said plastic by said former.

6. The mold of claim 1 wherein said resilient support means includes a compressible mount for said former and including means for restraining said former from motion in the direction of said mold closure.

7. The mold of claim 6 wherein said compressible mount is formed of elastomeric material.

8. The mold of claim 1 wherein said resilient support means includes means for allowing motion of said oblique surface relative to the closure motion of said mold, and means for restraining said oblique surface from motion in the direction of said mold closure.

9. The mold of claim 1 wherein said die surface includes a beveled edge communicating with said oblique surface, and said former is normally registered to contact said beveled edge for cutting said plastic.

10. The mold of claim 9 wherein said die surface includes a movable part forming said beveled edge and said oblique surface, and means for resiliently urging said movable part toward engagement with said former.

11. The mold of claim 10 wherein said die surface includes a pair of side surfaces angled outward from said oblique surface and shaped to stretch said plastic to form tear-lines and to cooperate with said former for tearing said plastic along said tear-lines and clearing the side edges of said opening.

12. The mold of claim 11 including means for mounting said surfaces to move apart, and resilient means for biasing said side surfaces toward a minimum separation.

13. The mold of claim 12 wherein said side surfaces are convergingly oblique to said closure motion of said mold to be pushed apart and scraped clear of said plastic by said former as said mold closes.

* * * * *